US012785898B2

(12) United States Patent
Park et al.

(10) Patent No.: US 12,785,898 B2
(45) Date of Patent: Nov. 3, 2026

(54) METHOD AND DEVICE FOR TRANSMITTING/RECEIVING CHANNEL STATE INFORMATION IN WIRELESS COMMUNICATION SYSTEM

(71) Applicant: LG ELECTRONICS INC., Seoul (KR)

(72) Inventors: Haewook Park, Seoul (KR); Jiwon Kang, Seoul (KR); Kyuseok Kim, Seoul (KR); Jaehoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 18/727,297

(22) PCT Filed: Jan. 16, 2023

(86) PCT No.: PCT/KR2023/000745
§ 371 (c)(1),
(2) Date: Jul. 8, 2024

(87) PCT Pub. No.: WO2023/140581
PCT Pub. Date: Jul. 27, 2023

(65) Prior Publication Data
US 2025/0096974 A1 Mar. 20, 2025

(30) Foreign Application Priority Data
Jan. 19, 2022 (KR) ........................ 10-2022-0007642

(51) Int. Cl.
*H04L 5/00* (2006.01)
*H04W 72/563* (2023.01)

(52) U.S. Cl.
CPC .......... *H04L 5/0051* (2013.01); *H04L 5/0057* (2013.01); *H04W 72/563* (2023.01)

(58) Field of Classification Search
CPC ... H04L 5/0051; H04L 5/0057; H04W 72/563
See application file for complete search history.

(56) References Cited

U.S. PATENT DOCUMENTS

2020/0169364 A1* 5/2020 Hao ...................... H04L 5/0044
2020/0304192 A1* 9/2020 Yum .................... H04B 7/0481
(Continued)

FOREIGN PATENT DOCUMENTS

CA 3030865 C * 7/2021 .......... H04W 72/542
WO WO-2021028425 A1 * 2/2021 .......... H04N 23/695
WO WO-2021102954 A1 * 6/2021 .......... H04B 7/0632

*Primary Examiner* — Saad A. Waqas
(74) *Attorney, Agent, or Firm* — Bryan Cave Leighton Paisner LLP

(57) ABSTRACT

A method by which a terminal transmits CSI in a wireless communication system, and a device are disclosed. The method by which a terminal transmits CSI in a wireless communication system according to one embodiment of the present disclosure, may comprise the steps of: receiving, from a base station, configuration information related to a plurality of CSI-RS resources; receiving, from the base station, CSI-RS based on the plurality of CSI-RS resources; and transmitting, to the base station on the basis of the CSI-RS, the CSI including a specific PMI determined on the basis of a plurality of time instances wherein the CSI can include a plurality of CQIs and RIs at each of the plurality of time instances, and a reference time instance of the CSI from among the plurality of time instances.

10 Claims, 9 Drawing Sheets

(56) References Cited

U.S. PATENT DOCUMENTS

| | | | |
|---|---|---|---|
| 2021/0143885 | A1 | 5/2021 | Grossmann et al. |
| 2021/0226674 | A1 | 7/2021 | Ramireddy et al. |
| 2021/0344399 | A1* | 11/2021 | Levy .................... H04L 5/0053 |
| 2021/0351188 | A1 | 11/2021 | Chavva et al. |
| 2021/0351885 | A1 | 11/2021 | Chavva et al. |

* cited by examiner

METHOD AND DEVICE FOR TRANSMITTING/RECEIVING CHANNEL STATE INFORMATION IN WIRELESS COMMUNICATION SYSTEM

CROSS-REFERENCE TO RELATED APPLICATIONS

This application is a National Stage application under 35 U.S.C. § 371 of International Application No. PCT/KR2023/000745, filed on Jan. 16, 2023, which claims the benefit of earlier filing date and right of priority to KR Application No. 10-2022-0007642, filed on Jan. 19, 2022, the contents of which are all hereby incorporated by reference herein in their entirety.

TECHNICAL FIELD

The present disclosure relates to a wireless communication system, and more specifically, to a method and device for transmitting and receiving channel state information (CSI) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for transmitting and receiving channel state information (CSI) in a wireless communication system.

Additionally, an additional technical problem of the present disclosure is to provide a method and device for compressing CSI measured at multiple viewpoints in a wireless communication system and transmitting and receiving the compressed CSI.

Additionally, an additional technical problem of the present disclosure is to provide a method and device for reporting a reference time point among a plurality of time points when transmitting and receiving compressed CSI in a wireless communication system.

The technical objects to be achieved by the present disclosure are not limited to the above-described technical objects, and other technical objects which are not described herein will be clearly understood by those skilled in the pertinent art from the following description.

According to one embodiment of the present disclosure, a method of transmitting channel state information (CSI) by a user equipment (UE) in a wireless communication system may include receiving, from a base station, configuration information related to a plurality of CSI-reference signal (RS) resources; receiving, from the base station, a CSI-RS based on the plurality of CSI-RS resources; and transmitting, to the base station, the CSI including a specific precoding matrix indicator (PMI) determined based on a plurality of time instances based on the CSI-RS, and the CSI may include a plurality of channel quality indicators (CQIs) and rank indicators (RIs) in each of the plurality of time instances, and a reference time instance of the CSI among the plurality of time instances.

According to one embodiment of the present disclosure, a method of receiving channel state information (CSI) by a base station in a wireless communication system may include transmitting, to a user equipment (UE), configuration information related to a plurality of CSI-reference signal (RS) resources; transmitting, to the UE, a CSI-RS based on the plurality of CSI-RS resources; and receiving, from the UE, the CSI including a specific precoding matrix indicator (PMI) determined based on a plurality of time instances based on the CSI-RS, and the CSI may include a plurality of channel quality indicators (CQIs) and rank indicators (RIs) in each of the plurality of time instances, and a reference time instance of the CSI among the plurality of time instances.

According to an embodiment of the present disclosure, a method and device for transmitting and receiving channel state information (CSI) in a wireless communication system may be provided.

In addition, according to an embodiment of the present disclosure, a method and device for compressing CSI measured at multiple viewpoints in a wireless communication system and transmitting and receiving the compressed CSI may be provided.

In addition, according to an embodiment of the present disclosure, when transmitting and receiving compressed CSI in a wireless communication system, a method and device can be provided for reporting a reference time point among a plurality of time points together.

In addition, according to an embodiment of the present disclosure, system performance can be improved by effectively performing CSI calculation reflecting the time domain/Doppler domain CSI compression method.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
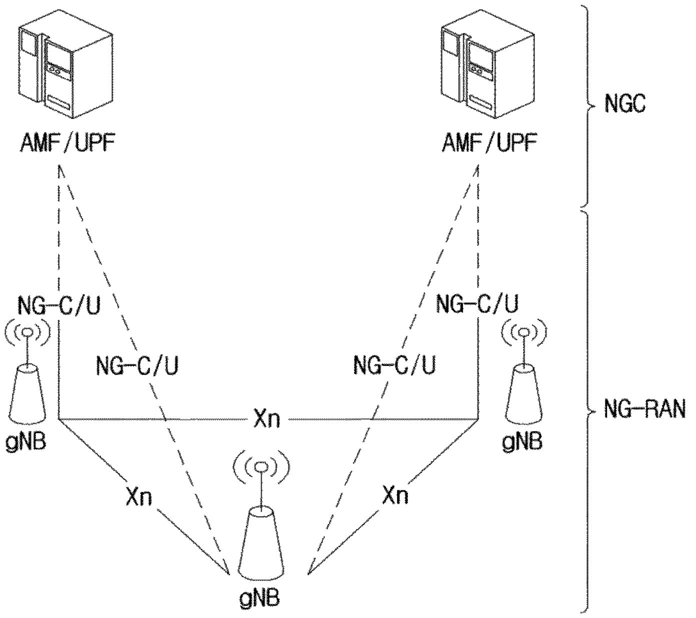
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
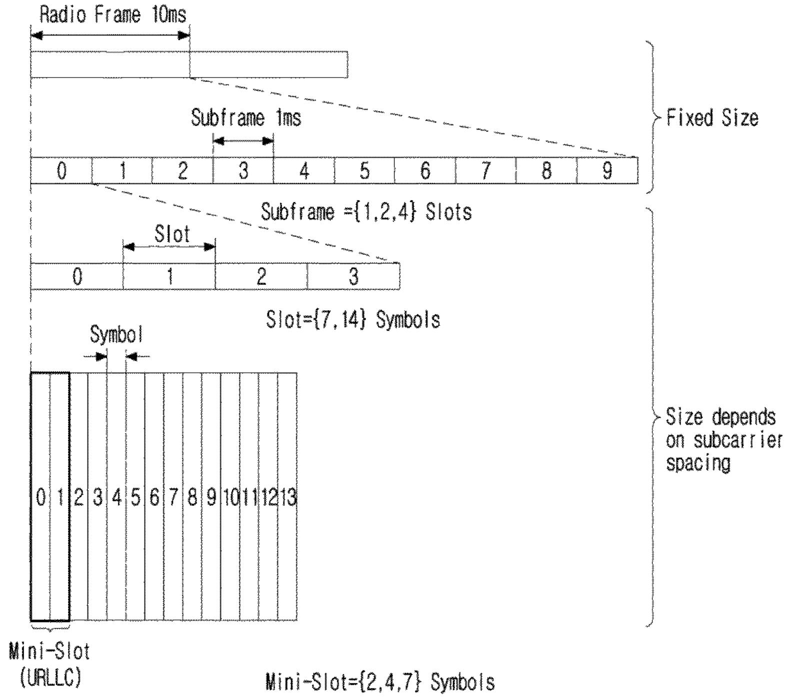
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000)\ T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})\ T_c$ than a corresponding downlink frame in a corresponding terminal starts. For a subcarrier spacing configuration μ, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
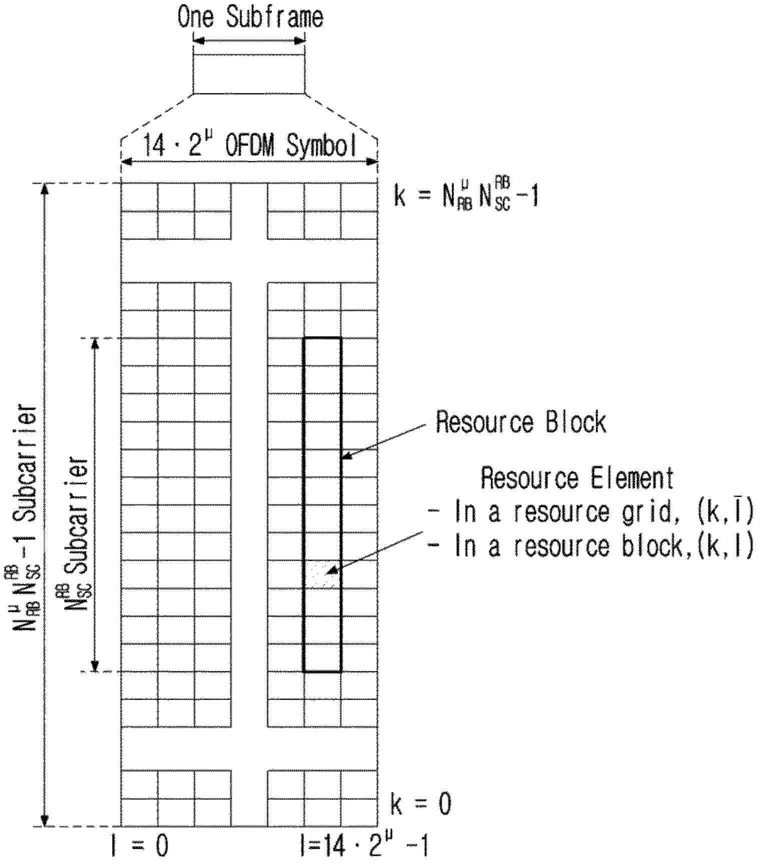
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies.

In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^{\mu} N_{sc}^{RB}-1$ is an index in a frequency domain and $l'=0, \ldots, 2^{\mu} N_{symb}^{(\mu)}-1$ refers to a position of a symbol in a subframe. When referring to a resource element in a slot, an index pair (k,l) is used. Here, $1=0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
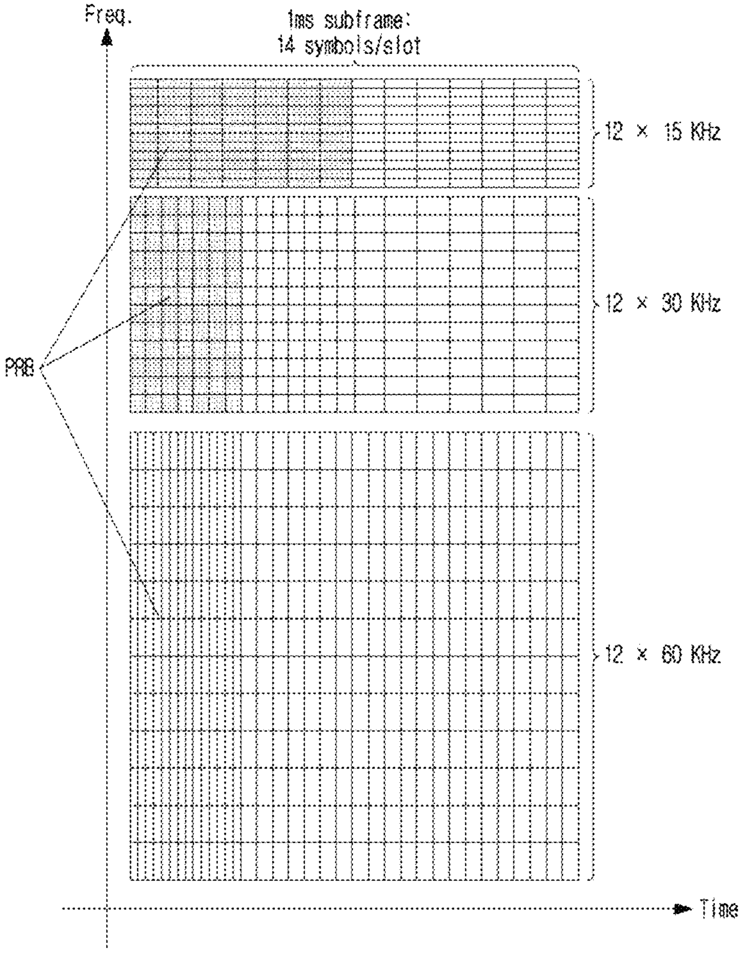
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
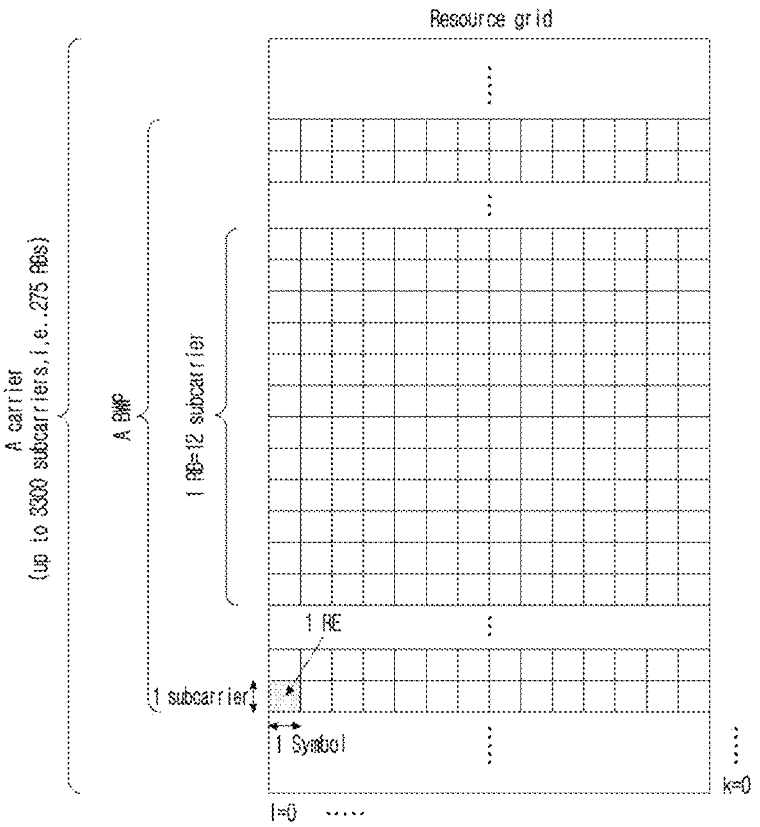
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP.

Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC.

A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP.

But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
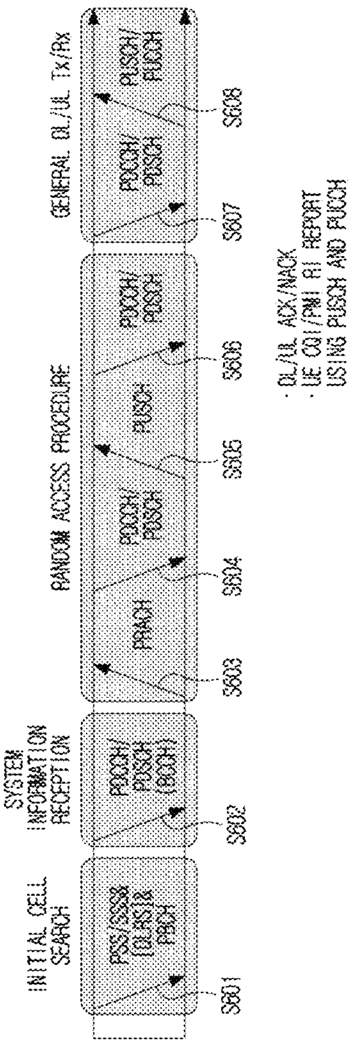
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 01 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

In CSI-RS, RE (resource element) mapping of CSI-RS resource is set in time and frequency domains by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

The NR system supports more flexible and dynamic CSI measurement and reporting. Here, the CSI measurement may include a procedure of receiving CSI-RS and acquiring CSI by computating the received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist.

Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset(Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

The network may activate and deactivate the configured SP CSI-RS/CSI-IM resource set of the serving cell by sending a SP CSI-RS/CSI-IM resource set activation/deactivation MAC CE. A configured SP CSI-RS/CSI-IM resource set may be initially deactivated upon configuration and after handover.

The MAC entity may perform the following operations.

1> if the MAC entity receives an SP CSI-RS/CSI-IM Resource Set Activation/Deactivation MAC CE on a Serving Cell:

2> indicating to lower layers the information regarding the SP CSI-RS/CSI-IM Resource Set Activation/Deactivation MAC CE.

And, the network may select among the configured aperiodic CSI trigger states of the serving cell by transmitting an aperiodic CSI trigger state sub-selection MAC CE.

The MAC entity may perform the following operations.

1> if the MAC entity receives an Aperiodic CSI trigger State Subselection MAC CE on a Serving Cell:

2> indicating to lower layers the information regarding Aperiodic CSI trigger State Subselection MAC CE.

Type II Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII'

The values of N1 and N1 are individually configured with higher layer parameters 'n1-n2-codebookSubsetRestriction' and 'CodebookConfig-N2'. The supported configurations of (N1, N2) and the corresponding values of (O1, O2) for a given number of CSI-RS ports are shown in Table 6 below.

TABLE 6

| Number of CSI-RS antenna ports, $P_{CSI-RS}$ | $(N_1, N_2)$ | $(O_1, O_2)$ |
|---|---|---|
| 4 | (2, 1) | (4, 1) |
| 8 | (2, 2) | (4, 4) |
| | (4, 1) | (4, 1) |
| 12 | (3, 2) | (4, 4) |
| | (6, 1) | (4, 1) |
| 16 | (4, 2) | (4, 4) |
| | (8, 1) | (4, 1) |
| 24 | (4, 3) | (4, 4) |
| | (6, 2) | (4, 4) |
| | (12, 1) | (4, 1) |
| 32 | (4, 4) | (4, 4) |
| | (8, 2) | (4, 4) |
| | (16, 1) | (4, 1) |

The L value is configured for the higher layer parameter 'numberOfbeams', where if the value of $P_{CSI-RS}$ is 4, the value of L is 2, and if the value of $P_{CSI-RS}$ is greater than 4, the value of L is {2, 3, 4}.

The value of NPSK is configured for the higher layer parameter phaseAlphabetSize, and $N_{PSK}$ belongs to {4, 8}.

The UE is configured by configuring the higher layer parameter subbandAmplitude to 'true' or 'false'.

The UE may not report RI>2.

When the v value associated with the RI value is less than 2, the codebook indices i1 and i2 corresponding to each PMI value are respectively as shown in Equation 3 and Equation 4 below.

$$i_1 = \begin{cases} [\,i_{1,1} \;\; i_{1,2} \;\; i_{1,3,1} \;\; i_{1,4,1}\,] & \upsilon = 1 \\ [\,i_{1,1} \;\; i_{1,2} \;\; i_{1,3,1} \;\; i_{1,4,1} \;\; i_{1,3,2} \;\; i_{1,4,2}\,] & \upsilon = 2 \end{cases} \quad \text{[Equation 3]}$$

[Equation 4]

$$i_2 = \begin{cases} [i_{2,1,1}] & subbandAmplitude = \text{'false'}, \upsilon = 1 \\ [\,i_{2,1,1} \;\; i_{2,1,2}\,] & subbandAmplitude = \text{'false'}, \upsilon = 2 \\ [\,i_{2,1,1} \;\; i_{2,2,1}\,] & subbandAmplitude = \text{'true'}, \upsilon = 1 \\ [\,i_{2,1,1} \;\; i_{2,2,1} \;\; i_{2,1,2} \;\; i_{2,2,2}\,] & subbandAmplitude = \text{'true'}, \upsilon = 2 \end{cases}$$

The L vector combined by the codebook may be identified with indices $i_{i,1}$ and $i_{i,2}$. Here, $i_{i,1}$ and $i_{i,2}$ may each be implemented as Equation 5 and Equation 6.

$$i_{1,1} = \{q_1, q_2\} q_1 \in \{0, 1, \ldots, O_1 - 1\}, q_2 \in \{0, 1, \ldots, O_2 - 1\} \quad \text{[Equation 5]}$$

$$i_{1,2} \in \left\{0, 1, \ldots, \binom{N_1 N_2}{L} - 1\right\} \quad \text{[Equation 6]}$$

And, n1 and n2 related to each of $N_1$ and $N_2$ found through $i_{1,2}$ may be implemented as in Equation 7.

$$n_2 = [n_1^{(0)}, \ldots, n_1^{(L-1)}],\; n_2 = [n_2^{(0)}, \ldots, n_2^{(L-1)}], \quad \text{[Equation 7]}$$

$$n_1^{(i)} \in \{0, 1, \ldots, N_1 - 1\},\; n_2^{(i)} \in \{0, 1, \ldots, N_2 - 1\}$$

And, combinatorial coefficients may be implemented as shown in Equation 8 and Table 7.

$$C(x, y) = \begin{cases} \binom{x}{y} & x \geq y \\ 0 & x < y \end{cases} \quad \text{[Equation 8]}$$

TABLE 7

| | y | | | |
|---|---|---|---|---|
| x | 1 | 2 | 3 | 4 |
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

The strongest coefficient in layer l (l=1, . . . , v) may be identified by $i_{1,3,l} \in \{1, \ldots, 2L-1\}$. The amplitude coefficient indicators $i_{1,4,l}$ and $i_{2,2,l}$ may be equal to Equation 9.

$$i_{1,4,l} = [k_{l,0}^{(1)}, k_{l,1}^{(1)}, \ldots, k_{l,2L-1}^{(1)}],\; i_{2,2,l} = [k_{l,0}^{(2)}, k_{l,1}^{(2)}, \ldots, k_{l,2L-1}^{(2)}], \quad \text{[Equation 9]}$$

$$k_{l,i}^{(1)} \in \{0, 1, \ldots, 7\},\; k_{l,i}^{(2)} \in \{0, 1\}$$

The phase coefficient indicator may be implemented as in Equation 10.

$$i_{2,1,l} = [c_{l,0}, c_{l,1}, \ldots, c_{l,2L-1}], \quad \text{[Equation 10]}$$

The mapping from $$k_{l,i}^{(1)}$$

to the amplitude coefficient $$p_{l,i}^{(1)}$$

can be as shown in Table 8, and the mapping from $$k_{l,i}^{(2)}$$

to the amplitude coefficient $$p_{l,i}^{(2)}$$

can be as shown in Table 8. The amplitude coefficient may be equal to Equation 11.

$$p_{l,i}^{(1)} = \left[p_{l,0}^{(1)}, p_{l,1}^{(1)}, \ldots, p_{l,2L-1}^{(1)}\right], \quad p_{l,i}^{(2)} = \left[p_{l,0}^{(2)}, p_{l,1}^{(2)}, \ldots, p_{l,2L-1}^{(2)}\right] \qquad \text{[Equation 11]}$$

TABLE 8

| $k_{l,i}^{(1)}$ | $p_{l,i}^{(1)}$ |
|---|---|
| 0 | 0 |
| 1 | $\sqrt{\frac{1}{64}}$ |
| 2 | $\sqrt{\frac{1}{32}}$ |
| 3 | $\sqrt{\frac{1}{16}}$ |
| 4 | $\sqrt{\frac{1}{8}}$ |
| 5 | $\sqrt{\frac{1}{4}}$ |
| 6 | $\sqrt{\frac{1}{2}}$ |
| 7 | 1 |

TABLE 9

| $k_{l,i}^{(2)}$ | $p_{l,i}^{(2)}$ |
|---|---|
| 0 | 0 |

Type II Port Selection Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII-PortSelection'

The number of CSI-RS ports is given by $P_{CSI\text{-}RS} \in \{4, 8, 12, 16, 24, 32\}$ as configured by higher layer parameter nrofPorts.

The value of L is configured with the higher layer parameter numberOfBeams, where L=2 when $P_{CSI\text{-}RS}=4$ and $L \in \{2,3,4\}$ when $P_{CSI\text{-}RS}>4$.

The value of d is configured with the higher layer parameter 'portSelectionSamplingSize', where d may be equal to Equation 12.

$$d \le \min\left(\frac{P_{CSI\text{-}RS}}{2}, L\right) \qquad \text{[Equation 12]}$$

The value of $N_{PSK}$ is configured with the upper layer parameter 'phaseAlphabetSize', and $N_{PSK}$ belongs to {4, 8}.

The UE is configured with the higher layer parameter 'subbandAmplitude' to 'true' or 'false'.

The UE shall not report RI>2

The UE may be configured with the higher layer parameter "typeII-PortSelectionRIRestriction". The bitmap parameter "typeII-PortSelectionRIRestriction" forms the bit sequences $r_1$ and $r_0$. Here, $r_0$ is LSB and $r_1$ is MSB. If $r_i$ is zero, $i \in \{0, 1\}$, PMI and RI reports do not correspond to any precoder associated with v+1 layers.

If the v value associated with the RI value is less than 2, the codebook indices $i_1$ and $i_2$ corresponding to each PMI value are as shown in Equation 13 below.

$$i_1 = \begin{cases} [\, i_{1,1} \;\; i_{1,3,1} \;\; i_{1,4,1} \,] & v = 1 \\ [\, i_{1,1} \;\; i_{1,3,1} \;\; i_{1,4,1} \;\; i_{1,3,2} \;\; i_{1,4,2} \,] & v = 2 \end{cases}, \qquad \text{[Equation 13]}$$

$$i_2 = \begin{cases} [i_{2,1,1}] & subbandAmplitude = \text{'}false\text{'}, v = 1 \\ [\, i_{2,1,1} \;\; i_{2,1,2} \,] & subbandAmplitude = \text{'}false\text{'}, v = 2 \\ [\, i_{2,1,1} \;\; i_{2,2,1} \,] & subbandAmplitude = \text{'}true\text{'}, v = 1 \\ [i_{2,1,1} \;\; i_{2,2,1} \;\; i_{2,1,2} \;\; i_{2,2,2}] & subbandAmplitude = \text{'}true\text{'}, v = 2 \end{cases}$$

In Equation 13, the L vectors combined by the codebook are identified by the $i_{1,1}$ and $i_{1,2}$ indices, and each value is as shown in Equation 14 below.

$$i_{1,1} \in \left\{0, 1, \ldots, \left\lceil \frac{P_{CSI-RS}}{2d} \right\rceil - 1\right\} \quad \text{[Equation 14]}$$

The strongest coefficient in layer l (e.g., l=1, . . . , v) may be identified by $i_{1,3,l} \in \{0, 1, \ldots, 2L-1\}$.

Amplitude coefficient indicators $i_{1,4,l}$ and $i_{2,2,l}$ may be equal to Equation 15.

$$i_{1,4,l} = \left[k_{l,0}^{(1)}, k_{l,1}^{(1)}, \ldots, k_{l,2L-1}^{(1)}\right], i_{2,2,l} = \left[k_{l,0}^{(2)}, k_{l,1}^{(2)}, \ldots, k_{l,2L-1}^{(2)}\right], \quad \text{[Equation 15]}$$

$$k_{l,i}^{(1)} \in \{0, 1, \ldots, 7\}, k_{l,i}^{(2)} \in \{0, 1\}$$

The mapping from $$k_{l,i}^{(1)}$$

to the amplitude coefficient $$p_{l,i}^{(1)}$$

may be as shown in Table 8, and the mapping from $$k_{l,i}^{(2)}$$

to the amplitude coefficient $$p_{l,i}^{(2)}$$

may be as shown in Table 8. The amplitude coefficient may be equal to Equation 11.

Enhanced Type II Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and UE configured with higher layer parameter codebookType set to ' typeII-r16'

The values of $N_1$ and $N_2$ are configured with the higher layer parameter n1-n2-codebookSubsetRestriction-r16. The supported configurations of $(N_1, N_2)$ for a given number of CSI-RS ports and the corresponding values of $(O_1, O_2)$ are given in Table 5.2.2.2.1-2. The number of CSI-RS ports, $P_{CSI-RS}$, is $2N_1N_2$.

The values of L, β and $p_v$ are determined by the higher layer parameter paramCombination-r16, where the mapping is given in Table 10.

TABLE 10

| paramCombination- | | $p_\upsilon$ | | |
|---|---|---|---|---|
| r16 | L | υ ∈ {1, 2} | υ ∈ {3, 4} | β |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/4 | 1/4 | 1/2 |
| 7 | 6 | 1/4 | — | 1/2 |
| 8 | 6 | 1/4 | — | 3/4 |

PMI values may correspond to the codebook indices of $i_1$ and $i_2$, and it can be implemented as in Equation 16. The precoding matrix indicated by PMI can be determined from the $L+M_\upsilon$ vector.

[Equation 16]

$$i_1 = \begin{cases} [\, i_{1,1} \; i_{1,2} \; i_{1,5} \; i_{1,6,1} \; i_{1,7,1} \; i_{1,8,1} \,] & v = 1 \\ [\, i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \,] & v = 2 \\ [\, i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3} \,] & v = 3 \\ [\, i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3} \; i_{1,6,4} \; i_{1,7,4} \; i_{1,8,4} \,] & v = 4 \end{cases}$$

$$i_2 = \begin{cases} [\, i_{2,3,1} \; i_{2,4,1} \; i_{2,5,1} \,] & v = 1 \\ [\, i_{2,3,1} \; i_{2,4,1} \; i_{2,5,1} \; i_{2,3,2} \; i_{2,4,2} \; i_{2,5,2} \,] & v = 2 \\ [\, i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \,] & v = 3 \\ [\, i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \; i_{2,3,4} \; i_{2,4,4} \; i_{2,5,4} \,] & v = 4 \end{cases}$$

The amplitude coefficient indicators $i_{2,3,l}$ and $i_{2,4,l}$ can be implemented as in Equation 17, and the phase coefficient indicators $i_{2,5,l}$ can be implemented as in Equation 18.

$$i_{2,3,l} = \left[\, k_{l,0}^{(1)} \;\; k_{l,1}^{(1)} \,\right], i_{2,4,l} = \left[k_{l,0}^{(2)} \ldots k_{l,M_\upsilon-1}^{(2)}\right], \quad \text{[Equation 17]}$$

$$k_{l,f}^{(2)} = \left[k_{l,0,f}^{(2)} \ldots k_{l,2L-1,f}^{(2)}\right],$$

$$k_{l,p}^{(1)} \in \{0, 1, \ldots, 15\}, k_{l,i,f}^{(2)} \in \{0, \ldots, 7\}$$

$$i_{2,5,l} = \left[c_{l,0} \ldots c_{l,M_\upsilon-1}\right], \quad \text{[Equation 18]}$$

$$c_{l,f} = [c_{l,0,f} \ldots c_{l,2L-1,f}], c_{l,i,f} \in \{0, \ldots, 15\}$$

Enhanced Type II Port Selection Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and UE configured with higher layer parameter codebookType set to 'typeII-r16'

The number of CSI-RS ports may be configured the same as the Type II port selection codebook.

The value of d is configured with the higher layer parameter 'portSelectionSamplingSize-r16', where d∈{1, 2, 3, 4} and d≤L.

The values of L, β and $p_\upsilon$ are determined by the higher layer parameter paramCombination-r16, where the mapping is given in Table 11.

TABLE 11

| paramCombination- | | $p_\upsilon$ | | |
|---|---|---|---|---|
| r16 | L | υ ∈ {1, 2} | υ ∈ {3, 4} | β |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ¼ | ¼ | ½ |

The UE may report the RI value υ according to the configured higher layer parameter 'typeII-PortSelectionRI-Restriction-r16', and the UE may not report υ>4.

The UE is configured with the higher layer bitmap parameter 'typeII-PortSelectionRI-Restriction-r16', which forms the bit sequence $r_3$, $r_2$, $r_1$, $r_0$. Here, $r_0$ may be the least significant bit (LSB) and $r_3$ may be the most significant bit (MSB). If $r_i$ is 0, then i∈{0, 1, 2, 3} and PMI and RI reporting cannot correspond to the precoder associated with the υ=i+1 layer. The PMI value corresponds to the codebook index of $i_1$ and $i_2$, which can be implemented as in Equation 16.

Non-zero coefficients, amplitude coefficients, amplitude and phase coefficient indicators, and codebook indicators ($i_{1,5}$ and $i_{1,6}$) for each layer of the enhanced Type II port selection codebook may be the same as the non-zero coefficient, amplitude coefficient, amplitude and phase coefficient indicator, and codebook indicator ($i_{1,5}$ and $i_{1,6}$) of each layer of the enhanced Type II codebook.

Further Enhanced Type II Port Selection Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII-PortSelection-r17'

The number of CSI-RS ports may be configured the same as the Type II port selection codebook.

The values α, M, and β are determined by the higher layer parameter 'paramCombination-r17' and may be defined/mapped as shown in Table 12.

TABLE 12

| paramCombination-r17 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

The parameter N∈{2,4} may be configured with the higher layer parameter 'valueOfN' when M is 2. The parameter R∈{1,2} is configured with the higher layer parameter 'numberOfPMI-SubbandsPerCQI-Subband-r17' when M=2, and it may be configured to R=1 when M=1.

The UE may report the RI value υ according to the configured higher layer parameter 'typeII-PortSelectionRI-Restriction-r17', and the UE may not report υ>4.

The UE is configured with the higher layer bitmap parameter 'typeII-PortSelectionRI-Restriction-r16', which forms the bit sequence $r_3$, $r_2$, $r_1$, $r_0$. Here, $r_0$ may be the least significant bit (LSB) and $r_3$ may be the most significant bit (MSB). If $r_i$ is 0, then i∈{0, 1, 2, 3} and PMI and RI reporting cannot correspond to the precoder associated with the υ=i+1 layer. The PMI value corresponds to the codebook index of $i_1$ and $i_2$, which can be implemented as in Equation 16.

The PMI value corresponds to the codebook index of $i_1$ and $i_2$, which can be implemented as in Equation 16. The precoding matrix indicated by PMI can be determined from the L+M vector. L may be $K_1/2$ and $K_1$ may be $\alpha P_{CSI\text{-}RS}$.

The amplitude coefficient indicators $i_{2,3,l}$ and $i_{2,4,l}$ can be implemented as in Equation 17, and the phase coefficient indicators $i_{2,5,l}$ can be implemented as in Equation 18.

A bitmap whose non-zero bits identify the coefficients reported in $i_{2,4,l}$ and $i_{2,5,l}$ may be represented by $i_{1,7,l}$. Equations related to $i_{1,7,l}$ may be implemented as Equation 19.

$$i_{1,7,l} = \left[k_{l,0}^{(3)} \ldots k_{l,M-1}^{(3)}\right], \ , k_{l,f}^{(3)} = \left[k_{l,0,f}^{(3)} \ldots k_{l,K_2-1,f}^{(3)}\right], k_{l,i,f}^{(3)} \in \{0, 1\} \quad \text{[Equation 19]}$$

Here, $$K_l^{NZ} = \sum_{i=0}^{K_1-1} \sum_{f=0}^{M-1} k_{l,i,f}^{(3)} \le K_0$$

is the number of nonzero coefficient for layer l=1, . . . , υ and $$K^{NZ} = \sum_{l=1}^{\upsilon} K_l^{NZ} \le 2K_0$$

is the total number of nonzero coefficients. If v≤2 and $K^{NZ}=K_1$ Mv, $i_{1,7,l}$ is not reported.

CSI Reporting Method and Resource Configuration Method Based on Compression of Time Domain Information As an example of the UE's CSI feedback method, one UE may report CSI based on a specific point in time. Therefore, when the channel between the base station and the UE has time-varying characteristics due to movement of the base station/UE and/or changes in the surrounding environment of the base station/UE, CSI reporting values based on one specific point in time may decrease in accuracy over time.

In order to overcome the above-mentioned shortcomings, the base station may indicate/configure the UE to report CSI for multiple time points together. If CSI for multiple time points is reported together, the overhead for the corresponding CSI feedback may increase.

In order to secure/prevent such an increase in overhead, it is assumed that there is a tendency (e.g., correlation) in the time domain between CSI for multiple time points. The UE may compress and report time domain information based on trends, thereby reducing CSI overhead.

For similar reasons, the UE may perform compression in the frequency domain using the tendency between CSIs in the frequency domain to construct a codebook (e.g., an enhanced type II codebook) and report it.

Hereinafter, a method of configuring resources and a reporting method of the UE to support CSI reporting (e.g., CRI/RI/PMI/CQI/LI reporting) based on compression in the time domain will be described.

Figure 7:
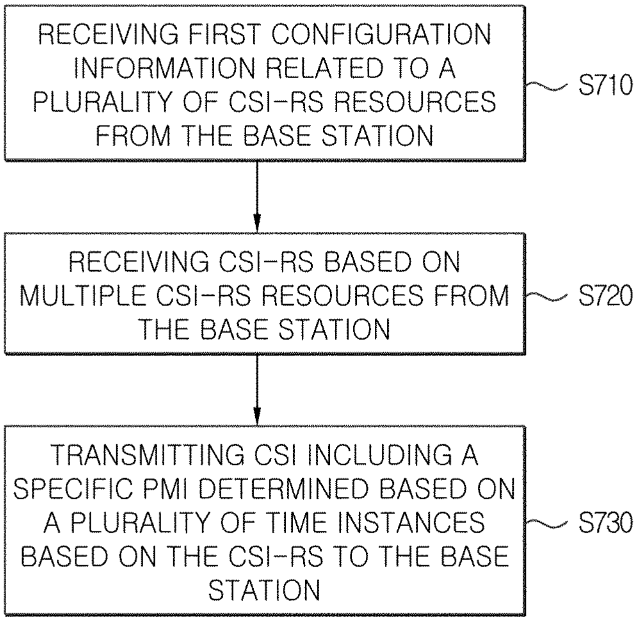
FIG. 7 is a diagram for describing a CSI transmission operation of a terminal in a wireless communication system to which the present disclosure may be applied.

FIG. 7 is a diagram for describing a CSI transmission operation of a UE in a wireless communication system to which the present disclosure may be applied.

The UE may receive first configuration information related to a plurality of CSI-RS (reference signal) resources from the base station (S710).

Here, the CSI-RS resource may include an NZP/ZP CSI-RS resource (or/and a group of NZP/ZP CSI-RS resources) or/and a CSI-RS port (or/and a CSI-RS port group).

The UE may receive second configuration information related to one or more resource sets from the base station. Here, the resource set may include one or more CSI-RS resources. That is, a plurality of CSI-RS resources may be grouped into one or more resource sets.

The first configuration information and the second configuration information may be transmitted from the base station to the terminal through a single RRC signaling, but are not limited thereto. The first configuration information and the second configuration information may be individually transmitted from the base station to the UE.

Additionally, a specific number of gap symbols or gap slots may be configured/defined/indicated between a plurality of CSI-RS resources. That is, the resource set may consist of one or more CSI-RS resources and gap symbols or gap slots set/indicated/defined between one or more CSI-RS resources.

In addition, the UE may receive first information about the period of one or more resource sets and the number of CSI-RS resources included in each of one or more resource sets from the base station. Here, the first information may be transmitted from the base station to the UE through at least one of RRC signaling, MAC-CE, or DCI.

Priorities may be configured differently between two or more CSI-RS resources included in a single resource set. For example, a predefined priority may be configured for CSI-RS resources of a specific reference slot within a single resource set (e.g., CSI-RS resources included in the first slot of a time window, etc.). And, within a single resource set, a low priority may be configured for the remaining CSI-RS resources except for the CSI-RS resource.

The UE may receive CSI-RS based on multiple CSI-RS resources from the base station (S720).

The UE may receive CSI-RS based on a plurality of CSI-RS resources included in one or more resource sets configured by the base station.

The UE may transmit CSI including a specific precoding matrix indicator (PMI) determined based on a plurality of time instances based on the CSI-RS to the base station (S730).

As an example of the present disclosure, the UE may measure and calculate the received CSI-RS as described above. Here, the UE may calculate a plurality of PMIs at each of a plurality of time instances (or a plurality of time points) based on the CSI-RS.

Additionally, the terminal may compress a plurality of PMIs based on a discrete Fourier transform (DFT) matrix in the time domain, include the specific compressed PMI in the CSI, and transmit it to the base station. That is, the terminal can report CSI including PMI in a compressed form based on the correlation of different coefficients in the time domain.

Additionally or alternatively, the UE may calculate a specific PMI representing multiple time instances based on CSI-RS. The UE may calculate a specific PMI representing multiple time instances using CSI-RS received over multiple time instances. A specific PMI determined based on a plurality of time instances may mean a specific PMI representing a plurality of time instances.

It is assumed that the UE reports compressed PMI and CRI/RI/CQI (of multiple time instances) together. When reporting CSI, the UE may also report a reference time instance (or reference point) of the CSI (e.g., the CRI/RI/CQI and/or PMI). The reference time instance may correspond to the strongest coefficient indicator (SCI).

Accordingly, the base station may restore the compressed PMI, and restore and predict CRI/RI/CQI, etc. for multiple time instances through SINR comparison between the reference time instance and the multiple time instances.

Additionally, CSI may include a time window size. Here, the time window may mean the number of NZP CSI-RS resources included in a single resource set or the number of sets of the at least one resource.

Here, the UE may receive second information related to the unit of time window from the base station. The second information may be transmitted from the base station to the terminal through at least one of RRC signaling, MAC-CE, or DCI.

As an example, information about the size of the time window may be transmitted from the base station to the UE through configuration information related to CSI reporting.

Figure 8:
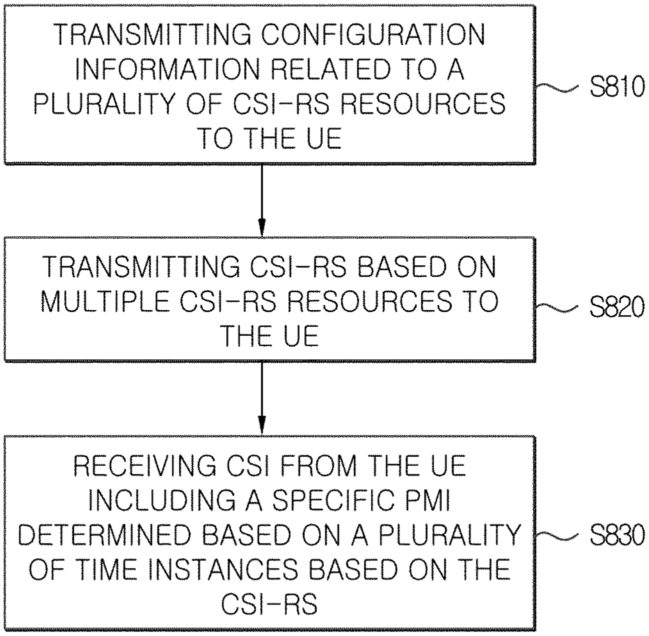
FIG. 8 is a diagram for describing the CSI reception operation of a base station in a wireless communication system to which the present disclosure may be applied.

FIG. 8 is a diagram for describing the CSI reception operation of a base station in a wireless communication system to which the present disclosure may be applied.

The base station may transmit configuration information related to a plurality of CSI-RS resources to the UE (S810).

Additionally or alternatively, the base station may transmit to the UE at least one of information related to a resource set consisting of CSI-RS resources and gap symbols/slots, or information related to a time window.

The base station may transmit CSI-RS based on multiple CSI-RS resources to the UE (S820). That is, the base station may transmit RS for channel state measurement to the UE.

The base station may receive CSI from the UE including a specific precoding matrix indicator (PMI) determined based on a plurality of time instances based on the CSI-RS (S830).

Steps S810, S820, and S830 and related parameters/operations may correspond to steps S710, S720, and S730 and related parameters/operations, so overlapping descriptions will be omitted.

Hereinafter, the CSI reporting method based on compression in the time domain and the resource configuration method to support it will be described in detail.

Embodiment 1

Embodiment 1 relates to a method for a UE to configure a resource set consisting of multiple resources for measuring time domain information and/or a method of configuring/indicating a specific number of symbols/slots to have a constant interval between a plurality of resources in the resource set.

Here, the plurality of resources may include NZP CSI-RS resources (and/or a group of NZP CSI-RS resources) and/or CSI-RS ports (and/or groups of CSI-RS ports), etc. The plurality of resources may include repeated transmission of the same number of specific resources or/and within a specific area (e.g., N slots, etc.).

For convenience of description of the present disclosure, a specific number of symbols/slots with a certain spacing may be referred to as gap symbols/slots. Gap symbols/slots may be configured/indicated to the UE based on L1 (e.g., DCI)/L2 signaling (e.g., MAC-CE)/higher layer signaling (e.g., RRC signaling/SIB, etc.). In particular, gap symbols/slots may be dynamically set/instructed to the UE based on MAC-CE/DCI, etc.

And, a 'resource set composed of multiple resources' can be named 'CSI-RS burst'. The UE may report time domain information to the base station based on one or more CSI-RS bursts and/or some resources within a single CSI-RS burst.

For example, time domain information may include time domain basis vector(s) (group), coefficient(s) for time domain basis vector(s) (group), etc.

Figure 9:
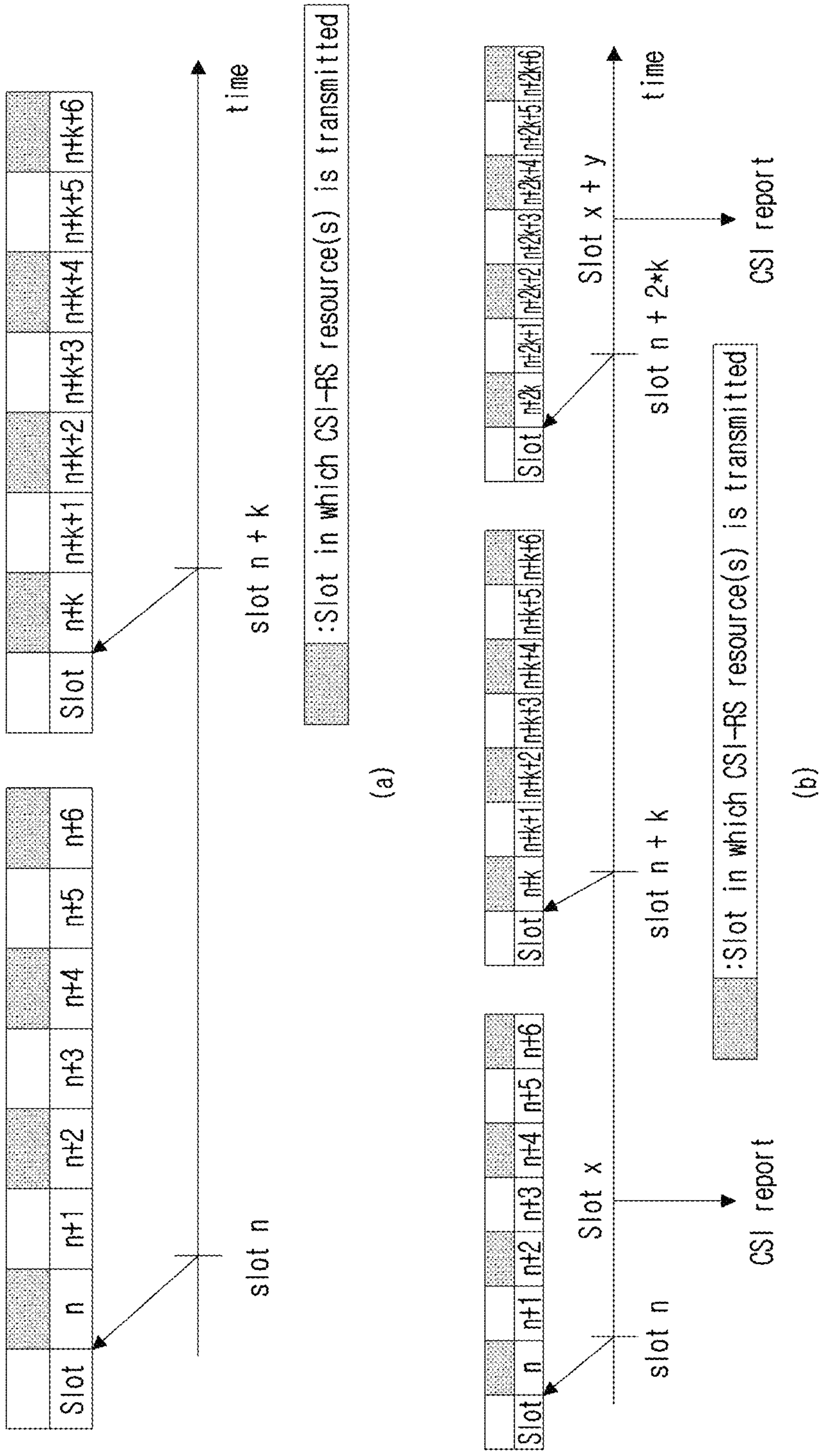
FIG. 9 is a diagram for describing a method of configuring a CSI-RS resource set and a CSI reporting method according to an embodiment of the present disclosure.

FIG. 9(*a*) shows an example of the present disclosure in which four multiple resources are transmitted in different time domains in slot n or slot n+k. In FIG. 9(*a*), it is assumed that the gap slot is defined/set/indicated to 1. Accordingly, a plurality of different resources (e.g., ZP/NZP CSI-RS resources) may be transmitted at 1 slot intervals within a specific range.

And, in FIG. 9(*a*), k may mean the period of one resource set composed of multiple resources. That is, k may mean the cycle in which x resource sets transmitted at 1 slot intervals are repeatedly transmitted.

As an example, k may be configured by the 'periodicityAndOffset' parameter in 'NZP-CSI-RS-Resource IE', which is higher layer signaling. For example, the period for the resource set may be configured based on the 'periodicityAndOffset' parameter. One resource set may be NZP-CSI-RS-Resource corresponding to the 'periodicityAndOffset' parameter transmitted (repeatedly) a specific number or/and within a specific area at gap slot intervals.

In order to configure one resource set, the number of resources and/or the range of resources (e.g., number of (consecutive) symbols/slots) in the resource set may be configured/indicated in addition to/instead of gap symbols/slots.

For example, when the number x of resources in a resource set is configured/indicated, one resource set may consist of x resources transmitted in gap symbol/slot units. Additionally or alternatively, when the range of the resource set is configured/indicated to x slots, one resource set may be composed of floor (x/number of gap slots) resources transmitted in the gap symbol/slot unit within the x slots.

Additionally or alternatively, a CSI-RS burst may be configured based on the symbol offset between x consecutive slots and each CSI-RS resource.

For example, the base station may configure the CSI-RS burst period (e.g., 5, 10, slots, etc.) and consecutive transmission slots (e.g., 2, 4, 8 slots, etc.) for the UE. The corresponding CSI-RS burst size and/or offset may be configured/indicated based on L1/L2 signaling or/and higher layer signaling.

When defining a gap symbol/slot within one resource set, it is possible to prevent unnecessarily occupying a large number of resources to detect time-varying channel characteristics of a specific UE.

For example, when the channel changes slowly, such as when the UE speed is slow (i.e., when the time-varying characteristics are weak), a gap slot/symbol with a large value may be configured/indicated. Accordingly, the UE may simultaneously reduce CSI-RS overhead by detecting time-varying characteristics.

On the other hand, when the channel changes rapidly, such as when the UE speed is high (i.e., when time-varying characteristics are strong), a gap slot/symbol with a small value may be configured/indicated. It can help the UE track the time-varying characteristics more accurately.

When a resource set consisting of a plurality of resources is configured/indicated for the UE based on the above-described Embodiment 1, the UE may detect the time domain characteristics of the channel based on the plurality of resources in the resource set.

For example, the UE may obtain correlation information in the time domain and report it to the base station. As a method for reporting correlation information in the time domain, the above-described DFT matrix-based reporting method (i.e., enhanced Type II codebook reporting method) may be applied.

For example, assuming N different amplitudes/phase coefficients in the time domain, N coefficients may be expressed using M DFT vectors among the N*O DFT vectors of an oversampled DFT matrix of N*O size. Here, O may mean an oversampling coefficient.

The above-described method may be expressed as Equation 20.

[Equation 20]

$$\begin{bmatrix} c_0 \\ c_1 \\ c_2 \\ \vdots \\ c_{N-1} \end{bmatrix} = \tilde{c}_0 \cdot v_{n_0} + \tilde{c}_1 \cdot v_{n_1} + \ldots + \tilde{c}_{M-1} \cdot v_{n_{M-1}}$$

In Equation 20, $C_i$ may mean the channel coefficient for the (i+1)th resource in one resource set. $\bar{c}_i$ and $v_{n_i}$ may each mean the coefficient for the (i+1)th DFT vector and the (i+1)th DFT vector for M DFT vectors selected among N*O DFT vectors.

The method using the oversampled DFT matrix described above is an example for reporting correlation information in the time domain, and is not intended to limit other methods applicable to the present disclosure. Accordingly, other basis matrices/vectors can be used to report time-domain correlation information, etc.

For example, a DCT-based basis matrix/vector may be applied. Additionally or alternatively, in order to configure the basis matrix/vector preferred by the UE, a method of representing a vector of length-M as M−1 coefficients (e.g., amplitude/phase) by hard-coding each coefficient of the basis vector may be applied.

Embodiment 2

Embodiment 2 relates to a method for the UE to report information related to the range of resources corresponding to time domain information when one or more resource sets are configured/indicated for the UE based on Embodiment 1.

Here, for convenience of explanation of the present disclosure, the 'range of resources' may be referred to as time window size. The time window size may be included in part 1 of CSI. The time window size may refer to the number of specific resources within a single resource set and/or the number of specific resource sets.

For example, in FIG. 9(*a*), the UE may report the time window size based on 4 resources and/or x resource sets.

As an example, when the UE reports 2 resources as a time window size, the corresponding report value may mean a CSI report based on the time-varying effect of 2 resources. Alternatively, when the UE reports a set of 4 resources with a time window size, the corresponding report value may mean a CSI report based on the time-varying effect of 16 resources in the set of 4 resources.

The size of a time-domain basis vector for expressing time-domain information may be determined based on the time window size reported by the UE.

For example, when referring to FIG. 9(*a*), when the UE reports one CSI-RS burst as the time window size, a time-domain basis vector may be selected based on a DFT matrix of size 4*O based on 4 resources in a single CSI-RS burst.

As another example, when reporting two CSI-RS bursts with a time window size, a time-domain basis vector may be selected based on a DFT matrix of size 8*O. Here, O may mean an oversampling coefficient.

The base station may configure/indicate the time window size through L1/L2 signaling or/and higher layer signaling for the terminal. However, this is only an example, and the time window size may be defined by a fixed rule.

For example, when reporting the time window size as a specific value, the UE may operate to report only the CSI for a specific time point. Here, the UE may be configured/indicated/defined to report CSI based on a specific codebook among the codebooks (e.g., Type II codebook, improved Type II codebook, additionally improved Type II codebook, etc.) described above (e.g., depending on the fallback mode).

The base station may configure/indicate the UE on the unit of the time window (e.g., symbol (or/and group of symbols)/slot (or/and group of slots)/sec(msec/usec/nsec/ . . . )) through L1/L2 signaling or/and higher layer signaling. As another example, the units of the time window may be defined by fixed rules. Alternatively, the UE may report the unit of the time window as a specific value to the base station.

Embodiment 3

Embodiment 3 relates to a method of differently defining priorities between resources within a time window.

As an example, if the time window size is configured/indicated/defined as a single CSI-RS burst, NZP/ZP CSI-RS resources within a single CSI-RS burst may be configured/indicated/defined to have different priorities.

For example, in a specific CSI-RS burst transmission, a specific reference slot (e.g., the first slot of the CSI-RS burst and the resources included in the slot) may have a predefined CSI-RS priority.

As another example, in a specific CSI-RS burst transmission, a low CSI-RS priority may be configured/indicated/defined for slots other than a specific reference slot. Accordingly, if the CSI-RS resource of the other slot overlaps with the PDSCH, the CSI-RS resource may be dropped.

Additionally or alternatively, the UE may also report the reliability level (e.g., hard value (0 or 1), soft value (0, 0. 1, . . . , 1)) for the time domain correlation.

Additionally or alternatively, the UE may fall back to the above-described codebook (e.g., Type II codebook, enhanced Type II codebook, further enhanced Type II codebook, etc.) and report an indicator (e.g., by part 1 of CSI) indicating whether the codebook is operating in fallback mode.

Even if some resources within the time window (e.g., CSI-RS burst) are dropped, the UE may implementally derive time-domain correlation using RS (e.g., TRS) for other purposes. A burst transmission format that bundles and transmits multiple resources may reduce the scheduling flexibility of the base station, but the present disclosure can compensate for the above shortcomings.

When the UE directly reports the time window size, the most appropriate CSI may be reported based on the degree of channel change.

Embodiment 4

Embodiment 4 relates to a method in which a UE that has configured/indicated one or more resource sets based on Embodiment 1 reports CRI/RI/PMI/CQI corresponding to a specific point in time and/or reports information about the specific point in time.

It is assumed that the UE reports different coefficients in the time domain in compressed form (or compressed CSI including different coefficients) based on correlation in the time domain. In order for the base station to restore accurate CSI based on the compressed CSI, the UE may report information about the point in time that the compressed CSI is based on to the base station along with the compressed CSI.

For example, the UE may obtain time-domain coefficients based on a plurality of resources at different times and report PMI in compressed form based on the obtained time-domain coefficients based on a DFT matrix.

When reporting CRI/RI/CQI along with compressed PMI, if the UE does not report the time point on which the CRI/RI/CQI and/or PMI are based (i.e., reference time point), the base station may have difficulty restoring and predicting multiple viewpoints.

On the other hand, if the above reference point is reported together, the base station may restore PMI and restore and predict CRI/RI/CQI for multiple time points through SINR comparison between the reference time point and multiple time points.

The specific time point (or/and reference time point) reported based on the method described above may be interpreted as the strongest coefficient indicator (SCI).

As an example, the UE may report an arbitrary value at a specific time point (or/and reference time point).

Additionally or alternatively, the base station may configure/indicate a specific value (e.g., first/last/middle time within a time window, etc.) to the UE through L1/L2 signaling and/or higher layer signaling. The UE may use the configured/indicated specific value as a specific time point (or/and reference time point).

Additionally or alternatively, a specific time point (or/and reference time point) may be defined by a fixed rule between the UE and the base station.

Embodiment 5

Embodiment 5 relates to a method in which a UE for which one or more resource sets are configured/indicated according to Embodiment 1 determines an arbitrary time window based on the CSI reporting time.

As an example of the present disclosure, FIG. 9(*b*) illustrates a method of performing CSI reporting in slot x and slot x+y. y slot may refer to the cycle of performing CSI reporting. For CSI reporting in slot x+y, the UE may report time domain information based on an arbitrary time window before the relevant time point.

For example, if the time window size is set to a single CSI-RS burst, the UE may perform CSI reporting based on the CSI-RS burst of slot n+2 k or the CSI-RS burst of slot n+k before slot x+y. The time window size may be configured/indicated for the UE through a CSI report configuration parameter (e.g., 'CSI-ReportConfig IE').

Embodiment 6

Embodiment 6 relates to a method of defining a valid time point for the precoding matrix of a CSI reference resource.

Here, a valid time point may mean a specific time point (e.g., nth slot) and/or a specific range (e.g., X slot).

In the frequency domain, the CSI reference resource may be defined as a downlink physical resource block group corresponding to the band related to the derived CSI.

In the time domain, the CSI reference resource for CSI reporting in uplink slot n' can be defined by a single downlink slot $$n - n_{CSI\_ref} - K_{offset} * \frac{2^{\mu_{DL}}}{2^{\mu_{K_{offset}}}}.$$

Here, $K_{offset}$ is configured by higher layer signaling by the base station, and $\mu_{k_{offset}}$ may be a subcarrier spacing configuration for $K_{offset}$ with a value of 0 for frequency range 1.

A PDSCH transmission method in which the UE can assume that PDSCH transmission will be performed in up to 8 transport layers may be defined. For CQI calculation, the UE may assume that the PDSCH signal on the antenna port of set [1000, . . . , 1000+v−1] for the v layer will be the signal corresponding to the corresponding symbol transmitted on antenna port [3000, . . . , 3000+P−1], as shown in Equation 18.

$$\begin{bmatrix} y^{(3000)}(i) \\ \cdots \\ y^{(3000+P-1)}(i) \end{bmatrix} = W(i) \begin{bmatrix} x^{(0)}(i) \\ \cdots \\ x^{(v-1)}(i) \end{bmatrix} \quad \text{[Equation 21]}$$

Here, P∈[1, 2, 4, 8, 12, 16, 24, 32] may be a vector of PDSCH symbols of layer mapping. $x(i)=[x^{(0)}(i) \ldots x^{(v-1)}(i)]^T$ may be the number of CSI-RS ports. If only one CSI-RS port is configured, W(i) may be 1.

As an example, if the higher layer parameter 'reportQuantity' of 'CSI-ReportConfig' where CQI is reported is configured to 'cri-RI-PMI-CQI' or 'cri-RI-LI-PMI-CQI', W(i) may be a precoding matrix corresponding to the reported PMI applicable to x(i).

As another example, if the higher layer parameter 'reportQuantity' of 'CSI-ReportConfig' where CQI is reported is configured to 'cri-RI-CQI', W(i) may be a precoding matrix corresponding to the report quantity configuration.

As another example, if the higher layer parameter 'reportQuantity' of 'CSI-ReportConfig' where CQI is reported is configured to 'cri-RI-i1-CQI', W(i) may be the precoding matrix corresponding to i1 being reported.

The corresponding PDSCH signal transmitted on antenna port [3000, . . . 3000+P−1] may have a ratio of energy per resource element (EPRE) to CSI-RS EPRE equal to the ratio associated with NZP CSI-RS.

When the UE reports PMI for multiple points in a specific time window to the base station, W in Equation 18 to be applied when calculating CQI between the base station and the UE needs to be defined.

For this purpose, the PMI reported by the UE may be defined as representing a valid PMI within the range from the time point n at which the PMI is reported to a specific X unit time (e.g., slot). In this case, the PMI reported by the UE may mean the PMI corresponding to time n at which the PMI is reported.

Figure 10:
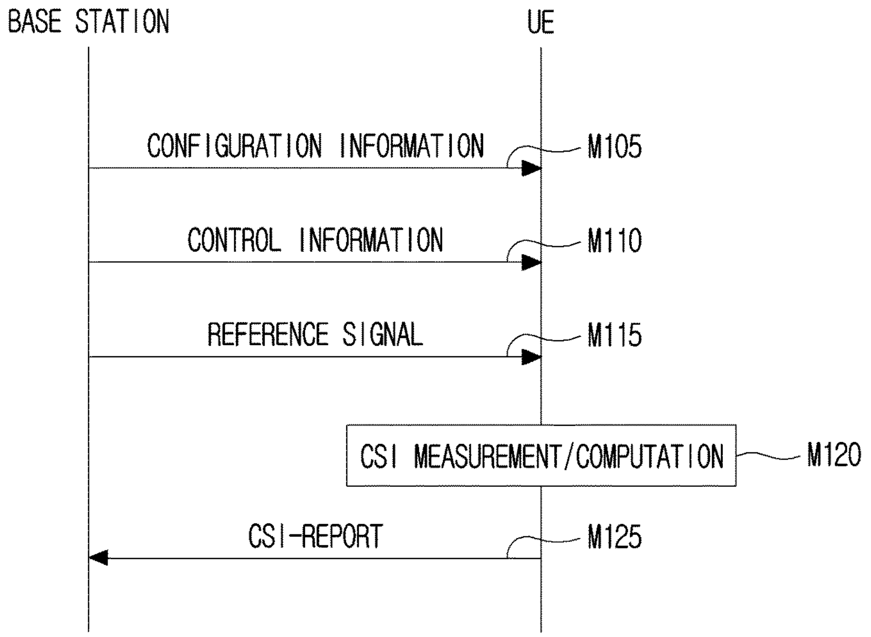
FIG. 10 is a diagram illustrating signaling procedures of the network side and the terminal according to an embodiment of the present disclosure.

FIG. 10 is a diagram for describing the signaling procedure of the network side and the UE according to an embodiment of the present disclosure.

FIG. 10 shows an example of signaling between a network side and a terminal (UE) in an M-TRP situation to which the Embodiments (e.g., Embodiment 1, Embodiment 2, Embodiment 3, Embodiment 4, Embodiment 5, Embodiment 6 or a combination of one or more of the detailed Embodiments) of the present disclosure described above may be applied.

Here, the UE/network side is an example and may be replaced with various devices as described with reference to FIG. 11. FIG. 10 is for convenience of explanation and does not limit the scope of the present disclosure. Additionally, some step(s) shown in FIG. 10 may be omitted depending on the situation and/or settings. Additionally, in the operation of the network side/UE in FIG. 10, the above-described uplink transmission and reception operation, M-TRP-related operation, etc. may be referenced or used.

In the following description, the network side may be one base station including a plurality of TRPs, or may be one cell including a plurality of TRPs. Alternatively, the network side may include a plurality of remote radio heads (RRHs)/remote radio units (RRUs). For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may receive configuration information from the base station (M105). That is, the base station may transmit configuration information to the UE.

For example, the configuration information may include information related to network-side configuration (i.e., TRP configuration), resource allocation information related to M-TRP-based transmission and reception, etc. The configuration information may be transmitted through a higher layer (e.g., RRC, MAC CE). The configuration information may include information related to uplink transmission based on a configured grant (CG).

As another example, the configuration information may include system information, scheduling information, CSI-related configuration information (e.g., configuration information related to CSI reporting settings, configuration information related to CSI-RS resource settings, etc.). Additionally, if the configuration information is defined or configured in advance, the corresponding step may be omitted.

As another example, as described in the above-described embodiment (e.g., Embodiment 1, Embodiment 2, Embodiment 3, Embodiment 4, Embodiment 5, Embodiment 6 or a combination of one or more of the detailed Embodiments thereof), the configuration information may include 'NZP-CSI-RS-Resouceset IE'/'NZP-CSI-RS-ResourceID'/CSI measurement setting information/CSI reporting configuration information (e.g., 'CSI-ReportConfig')/CSI resource configuration information (e.g., 'CSI-ResourceConfig'), etc.

As another example, the configuration information may include PDCCH-related configuration information and/or PDSCH-related configuration information.

As another example, the configuration information may include information about the number (e.g., K) of CSI that the UE should actually report among all candidates that can be reported as CSI. For example, based on the configuration information, the maximum number of coefficients that the UE must report may be configured/indicated for each layer or across layers.

For example, based on the configuration information, information related to reciprocity between DL/UL channels (e.g., whether DL/UL reciprocity, degree of similarity between DL/UL channels, etc.) may be configured for the UE.

For example, the operation of the UE (100 or 200 in FIG. 11) in the above-described M110 step receiving the configuration information from the network side (200 or 100 in FIG. 11) may be implemented by the device in FIG. 11, which will be described below. For example, referring to FIG. 11, one or more processors 102 may control one or more transceivers 106 and/or one or more memories 104, etc. to receive the setting information, and one or more transceivers 106 may receive the configuration information from the network side.

The UE may receive control information from the base station (M110). That is, the base station may transmit control information to the UE. For example, the control information may include DCI, and the DCI may be transmitted from the base station to the terminal through PDCCH.

For example, the control information may include indication information for CSI reporting. For example, the control information may include information for triggering aperiodic CSI reporting. For example, if semi-persistent CSI reporting/periodic CSI reporting is performed/configured, step M110 may be omitted.

For example, the control information may include information about the number (e.g., K) of candidates that the UE should actually report among all candidates that can be reported as CSI. For example, based on the control information, the maximum number of coefficients that the UE must report may be configured/indicated for each layer or across layers.

For example, the operation of the UE (100 or 200 in FIG. 11) in the above-described M110 step receiving control information from the network side (200 or 100 in FIG. 11) can be implemented by the device in FIG. 11, which will be described below. For example, referring to FIG. 11, one or more processors 102 may control one or more transceivers 106 and/or one or more memories 104, etc. to receive control information, and one or more transceivers 106 may receive control information from the network side.

The UE may receive RS (e.g., SSB/CSI-RS/TRS/PT-RS) for channel state measurement from the base station (M115). That is, the base station may transmit RS to the UE.

For example, the RS may be transmitted periodically/non-periodically/semi-periodically from the base station to the UE. For example, as described in the above-described embodiment (e.g., Embodiment 1, Embodiment 2, Embodiment 3, Embodiment 4, Embodiment 5, Embodiment 6 or a combination of one or more of the detailed Embodiments thereof, etc.), a (beamformed) CSI-RS port to which precoding in the SD (spatial domain) and precoding in the FD (frequency domain) is applied can be transmitted to the UE.

For example, the operation of the UE (100 or 200 in FIG. 11) in the above-described M115 step receiving the RS from the network side (200 or 100 in FIG. 11) can be implemented by the device in FIG. 11, which will be described below. For example, referring to FIG. 11, one or more processors 102 may control one or more transceivers 106 and/or one or more memories 104 to receive the RS, and one or more transceivers 106 may receive the RS from a network side.

The UE may perform CSI measurement based on the RS and information received from the base station (e.g., information on reporting configurations, information indicated by DCI, etc.) (M120).

For example, when the UE performs CSI measurement, it may be based on the above-described embodiment (e.g., Embodiment 1, Embodiment 2, Embodiment 3, Embodiment 4, Embodiment 5, Embodiment 6 or a combination of one or more of the detailed Embodiments thereof, etc.). For example, CSI measurement may be performed based on a codebook (e.g., Type I, Type II, improved Type II, port selection codebook, further enhanced Type II port selection codebook, etc.).

For example, the operation in which the above-described M120 step terminal (100/200 in FIG. 11) performs CSI measurement can be implemented by the device in FIG. 11, which will be described below. For example, referring to FIG. 11, one or more processors 102 may control one or more transceivers 106 and/or one or more memories 104, etc. to perform the CSI measurement.

The UE may report CSI to the base station (M125). That is, the base station may receive CSI from the UE.

For example, the CSI reporting operation may be performed using the CSI reporting method described above. For example, the CSI report may be transmitted from the UE to the base station through an uplink channel (e.g., PUCCH/PUSCH). For example, the CSI may include PMI/CQI/RI, etc.

For example, as described in the above-described embodiment (e.g., Embodiment 1, Embodiment 2, Embodiment 3, Embodiment 4, Embodiment 5, Embodiment 6 or a combination of one or more of the detailed examples thereof, etc.), codebook-based CSI reporting may be performed.

For example, based on the CSI, the base station may transmit data scheduling information and/or data/RS (for data decoding) based on the scheduling information to the UE.

Data scheduling and precoding to be applied to data may be determined/calculated by the base station based on the CSI reported by the UE, etc. However, this is only an example, and the base station may not determine/calculate data scheduling and precoding to be applied to the data by considering only the CSI reported by the UE.

For example, the operation of the UE in the above-described M125 step (100/200 in FIG. 11) reporting CSI to the base station may be implemented by the device of FIG. 11, which will be described below. For example, referring to FIG. 11, one or more processors 102 may control one or more transceivers 106 and/or one or more memories 104 to report the CSI, and one or more transceivers 106 may transmit the CSI.

For example, the operation of the above-described M125 step base station (100/200 in FIG. 11) receiving CSI from the UE can be implemented by the device of FIG. 11, which will be described below. For example, referring to FIG. 11, one or more processors 102 may control one or more transceivers 106 and/or one or more memories 104 to receive the CSI, and one or more transceivers 106 may receive the CSI.

General Device to which the Present Disclosure May be Applied

Figure 11:
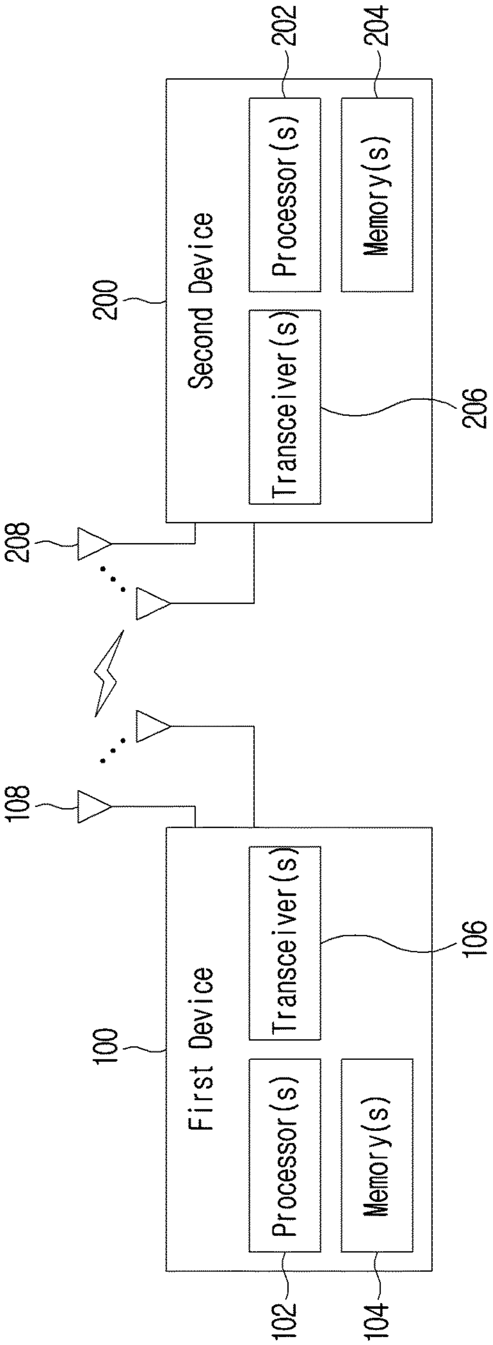
FIG. 11 illustrates a block diagram of a wireless communication device according to an embodiment of the present disclosure.

FIG. 11 is a diagram which illustrates a block diagram of a wireless communication system according to an embodiment of the present disclosure.

In reference to FIG. 11, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE) from a base station, configuration information related to a plurality of channel state information -reference signal (CSI-RS) resources;

receiving, by the UE from the base station, a CSI-RS based on the plurality of CSI-RS resources; and transmitting, by the UE to the base station, CSI including a single precoding matrix indicator (PMI) for a plurality of time instances based on the CSI-RS, wherein the CSI includes a plurality of channel quality indicators (CQIs) and rank indicators (RIs) in each of the plurality of time instances, and a reference time instance of the CSI among the plurality of time instances, and wherein the reference time instance is a time instance having a strongest coefficient indicator.

2. The method of claim 1, wherein:

the plurality of CSI-RS resources are grouped into at least one resource set, and a specific number of gap symbols or gap slots are configured between the plurality of CSI-RS resources.

3. The method of claim 2, wherein:

first information on a period of at least one resource set and a number of CSI-RS resources included in each of the at least one resource set is received from the base station.

4. The method of claim 2, wherein:

the CSI includes information related to a size of a time window, and the size of the time window is a number of non-zero power (NZP) CSI-RS resources included in a single resource set or a number of sets of the at least one resource.

5. The method of claim 4, wherein:

second information related to a unit of the time window is received from the base station or is predefined.

6. The method of claim 4, wherein:

the information related to the size of the time window is received from the base station through configuration information related to CSI reporting.

7. The method of claim 2, wherein:

priorities of two or more CSI-RS resources included in a single resource set are configured differently.

8. The method of claim 1, wherein:

the single PMI is compressed based on a discrete Fourier transform (DFT) matrix in a time domain.

9. A user equipment (UE) comprising:

at least one transceiver; and at least one processor connected to the at least one transceiver, wherein the at least one processor is configured to:

receive, from a base station through the at least one transceiver, configuration information related to a plurality of channel state information-reference signal (CSI-RS) resources;

receive, from the base station through the at least one transceiver, a CSI-RS based on the plurality of CSI-RS resources; and transmit, to the base station through the at least one transceiver, CSI including a single precoding matrix indicator (PMI) for a plurality of time instances based on the CSI-RS, wherein the CSI includes a plurality of channel quality indicators (CQIs) and rank indicators (RIs) in each of the plurality of time instances, and a reference time instance of the CSI among the plurality of time instances, and wherein the reference time instance is a time instance having a strongest coefficient indicator.

10. A base station comprising:

at least one transceiver; and at least one processor connected to the at least one transceiver, wherein the at least one processor is configured to:

transmit, to a user equipment (UE) through the at least one transceiver, configuration information related to a plurality of channel state information-reference signal (CSI-RS) resources;

transmit, to the UE through the at least one transceiver, a CSI-RS based on the plurality of CSI-RS resources; and receive, from the UE through the at least one transceiver, CSI including a single precoding matrix indicator (PMI) for a plurality of time instances based on the CSI-RS, wherein the CSI includes a plurality of channel quality indicators (CQIs) and rank indicators (RIs) in each of the plurality of time instances, and a reference time instance of the CSI among the plurality of time instances, and wherein the reference time instance is a time instance having a strongest coefficient indicator.

* * * * *